(12) United States Patent
Tsien

(10) Patent No.: US 7,620,694 B2
(45) Date of Patent: Nov. 17, 2009

(54) EARLY ISSUE OF TRANSACTION ID

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 11/237,285

(22) Filed: Sep. 27, 2005

(65) Prior Publication Data

US 2007/0073856 A1 Mar. 29, 2007

(51) Int. Cl.
*G06F 15/163* (2006.01)
*G06F 13/20* (2006.01)

(52) U.S. Cl. .................... 709/214; 711/121; 712/26

(58) Field of Classification Search ................ None
See application file for complete search history.

(56) References Cited

U.S. PATENT DOCUMENTS

| 6,009,488 | A | 12/1999 | Kavipurapu |
| 7,213,109 | B1 * | 5/2007 | Bauman et al. ............. 711/133 |
| 7,376,793 | B2 * | 5/2008 | Cypher et al. ............... 711/140 |

* cited by examiner

*Primary Examiner*—Gary J Portka
(74) *Attorney, Agent, or Firm*—Blakely, Sokoloff, Taylor & Zafman LLP

(57) ABSTRACT

Early issue of transaction ID is disclosed. An apparatus comprising decoder to generate a first node ID indicative of the destination of a cache transaction from a caching agent, a transaction ID allocation logic coupled to and operating in parallel to the decoder to select a transaction ID (TID) for the transaction based on the first node ID, a packet creation unit to create a packet that includes the transaction, the first node ID, the TID and a second node ID corresponding to the requestor.

24 Claims, 9 Drawing Sheets

EARLY ISSUE OF TRANSACTION ID

FIELD OF INVENTION

Generally, embodiments of the invention relate to integrated electronics and integrated electronics systems. More specifically, embodiments of the invention relate to a technique and corresponding infrastructure to generate transaction IDs for events corresponding to operations for caching agents operating according to a caching protocol.

BACKGROUND

Computer systems and processor architectures, in particular, can use various types communication networks and protocols to exchange information between agents, such as electronic devices, within those systems and architectures. Multiple processing elements ("processing cores") in a microprocessor, for example, use caching agents to store, retrieve, and exchange data between the various cores of the microprocessor. Likewise, computer systems in which single or multiple core microprocessors are interconnected may use caching agents to store, retrieve and exchange data between the microprocessors or other agents.

In electronic networks, cached data is managed and exchanged according to certain rules, or "protocol," such that coherency is maintained among the various caches and the devices, such as processing cores, that use the cached data. Caching activity across these devices directly serviced by the caches, such as lookup operations, store operations, invalidation operations, and data transfer operations, can be managed by logic or software routine (collectively or individually referred to as a "cache agent"), such that cache coherency is maintained among the various caches and cache agents. Caching activity within or outside of a microprocessor, such as snoop resolution, write-backs, fills, requests, and conflict resolution, can be managed by logic or software routine (collectively or individually referred to as a "protocol agent"), such that coherency is maintained among the various cache agents and processing cores within the microprocessor and among agents external to the microprocessor. In some prior art multi-core or single-core processors, for example, the caching agent is coupled to a specific coherence protocol agent, which may be physically integrated within the caching agent to which it corresponds. This means that the same circuit and/or software routine may be responsible for implementing cache operations, such as requests, dirty block replacement, fills, reads, etc., as the protocol for managing these operations.

FIG. 1 illustrates a prior art microprocessor having a number of caching agents, each having circuitry to implement the caching protocol used among the caching agents of the microprocessor. In the prior art processor of FIG. 1, each caching agent is responsible for implementing and keeping track of the cache protocol as applied to itself. That is, each cache agent is coupled to a protocol agent, such that the same unit is responsible for both cache operations and the coherence protocol. Unfortunately, this "decentralized" caching protocol architecture requires redundant use of protocol logic and/or software to maintain the caching protocol among all caching agents within the processor or computer system to which the protocol corresponds. In the case of the protocol being implemented using complementary metal-oxide-semiconductor (CMOS) logic devices, this can result in substantial power consumption by the processor or system, especially in multi-core processors having a number of caching agents.

Furthermore, the prior art caching architecture of FIG. 1 may be somewhat bandwidth limited in the amount of caching traffic supported among the caching agents, as each caching agent has to share the same bus, cache agent ports, and cache agent queuing structure that facilitate communication among the various caching agents.

To correctly identify transactions in a system, often transaction IDs are used. These transaction IDs are often assigned based on a number of factors. However, if there is one or more dependencies upon which selection of a transaction ID is based, then there can be latency added into the processing of the transaction itself. This is especially true in the case where the processing of a transaction occurs in a pipeline with various stages of the pipeline dependent on previous stages. Such added latencies can affect performance and should be avoided.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
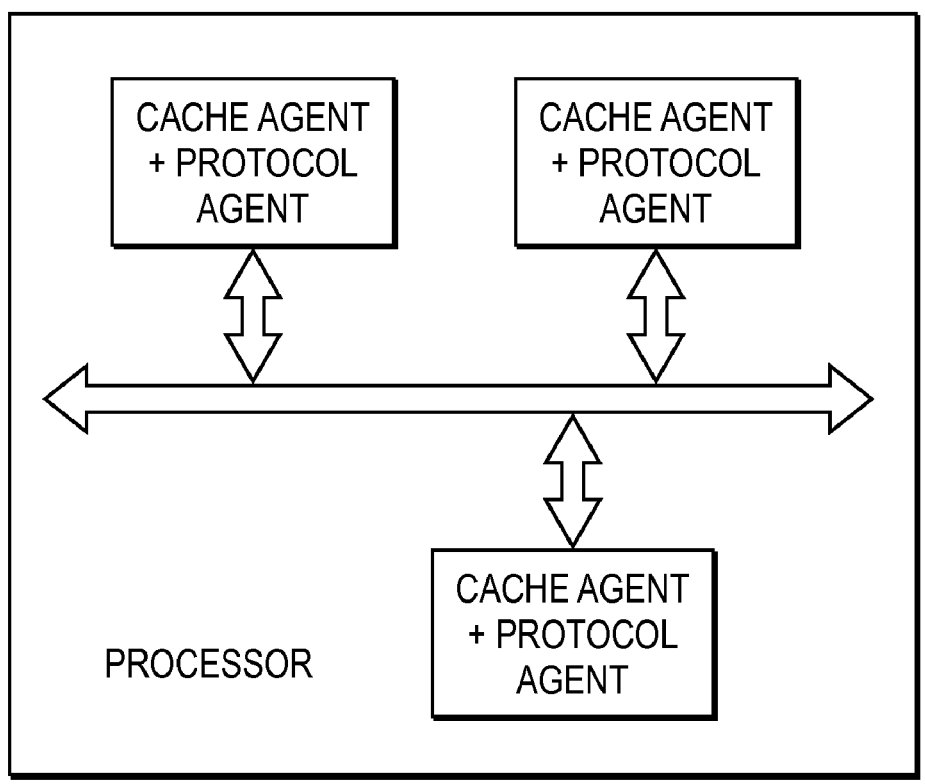
FIG. 1 illustrates a prior art caching architecture used within a microprocessor or computer system.

A method and apparatus for generating transactions identifiers to identify transactions (e.g., cache events) is disclosed. Embodiments of the invention disclosed herein may be used as part of a caching architecture that may be used in an electronic device, such as a single core or multiple core microprocessor, or an electronics system, such a shared bus computer system or a point-to-point (P2P) bus computer system. More particularly, one embodiment of the invention includes a caching architecture, in which the caching protocol is more centralized and decoupled from the caching agents to which the protocol corresponds than in some prior art caching architectures.

With cache agents and protocol agents being detached, the protocol agent is kept current with the coherence information manifested in the form of a set of cache operation events from the cache agents. The protocol agents receive this coherence information from cache agents through an on-chip, or local, interconnection network. In this manner, certain types of cache events may have their order maintained, so the protocol agents have a view of the internal cache states in the cache agents it services to form system level coherence protocol decisions. This virtual communication channel of events under a set of ordering rules is known as a pre-coherence channel.

The cache agents generate transactions corresponding to cache events. Each of transactions has a transaction identifier (ID) to identify it throughout the network. In one embodiment, the generation of the transaction IDs is dependent, at least in part, on the home (i.e. destination) node ID of a transaction in a fashion that there is a pool of transaction IDs corresponding to each home node or group of home nodes, so that different home nodes or groups of home nodes have separate and independent pools of transaction IDs. The transaction ID, used in conjunction with the home node ID, uniquely identifies a request from a requestor node in a system. This allows buffer space optimization in embodiments where buffer space for transactions is preallocated at the home node per transaction from each requestor node, since transactions IDs are only assigned to transactions from a requestor to the particular home node or groups of home nodes, buffer space requirement is reduced.

In one embodiment, these transactions IDs are allocated in a manner that reduces latency. The transaction may be generated in a protocol agent through the use of a decoder, a transaction ID allocation logic and a packet creation unit. The decoder (e.g., a source address decoder) generates a first node ID (e.g., a home node ID) indicative of the destination of a cache transaction from a caching agent. The transaction ID allocation logic operates in parallel to the decoder to select a transaction ID (TID) for the transaction based on the first node ID. The packet creation unit (e.g., inflight table, MAF, etc.) creates a packet that includes the transaction, the first node ID, the TID and a second node ID, which is the node ID corresponding to the requestor itself.

In one embodiment, the interconnection network is a network of rings optimized for cache transfer between cores and caches. In one embodiment, there are three different types of ring networks to facilitate this: an address ring, a no-address ring, and a data ring. In one embodiment, every message is one phit in length and the network with three types of rings exists to balance the message load between the rings. For instance, a read request on address is balanced by a cache response on data. In one embodiment, each of the ring networks is arbitrated separately. A ring guarantees point-to-point ordering, but ordering across different rings can be skewed, so keeping ordering across ring networks means ordered injection into the ring networks from a source.

In one embodiment, to benefit most from the out-of-orderness allowed by the pre-coherence channel on this rings-based architecture, messages are split across address and no-address networks in the following way. In one embodiment, a cache agent communicates with a protocol agent using two signals that operate in part of the local, interconnection network: one signal ("AD") to communicate addressed caching operations, such as data and/or cache ownership requests, data write-back operations, and snoop responses with data for cache-to-cache transfers, from a cache agent, and one signal ("AK") to communicate non-address responses, such as cache fill acknowledgements and non-data snoop responses, such as a cache "hit" or "miss" indication.

Figure 2:
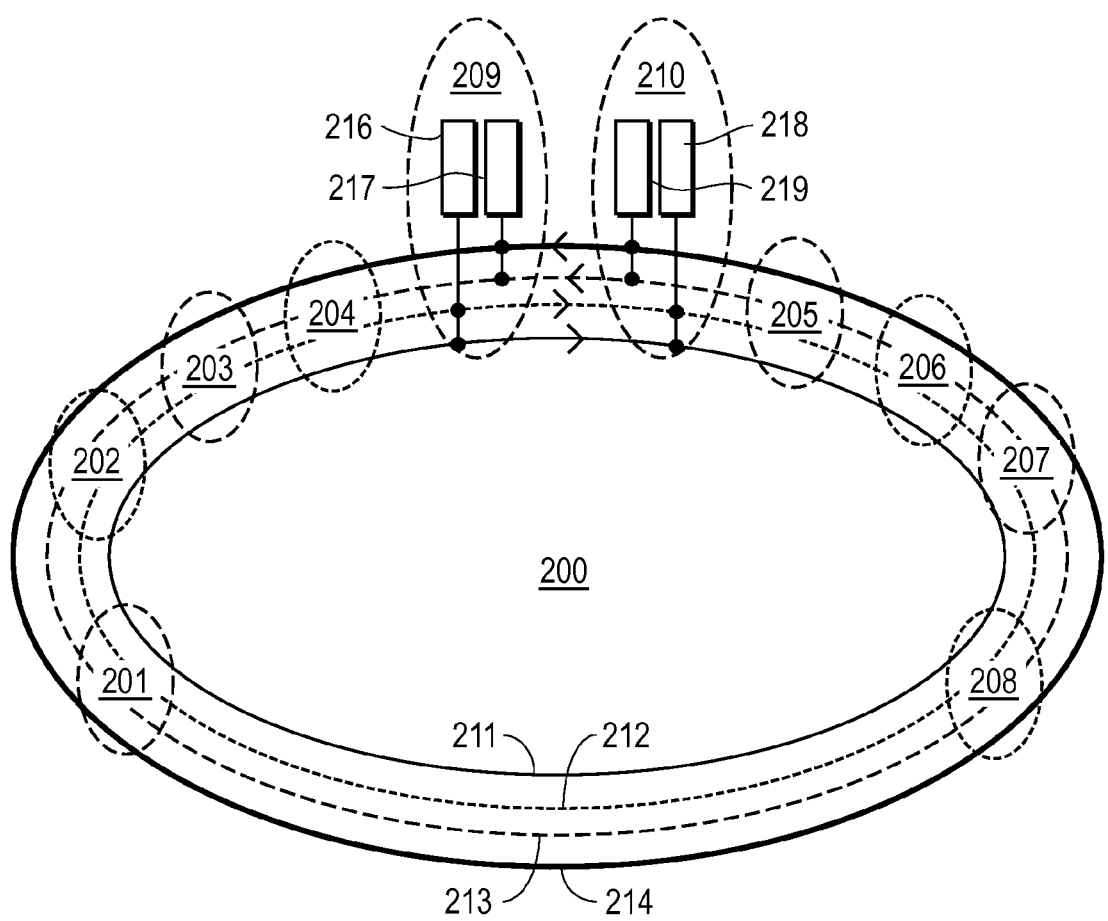
FIG. 2 illustrates a caching architecture according to one embodiment of the invention.

In one embodiment, the concurrent bidirectional characteristics of the signals, AD and AK, can be conceptualized by two sets of cache agents, routing circuits, and a protocol agent interconnected by two signals, or "rings," transmitting an AK and AD signal, respectively, in one direction. FIG. 2, for example, illustrates one embodiment of a caching architecture, in which the two signals, AD and AK, are conceptualized as four rings, two of which are capable of transmitting information in a clockwise direction and two of which are capable of transmitting information in a counter clockwise direction. In particular, the caching architecture 200 of FIG. 2 depicts a first set of caching agents 201, 203, 205, and 207 that correspond to a first caching protocol agent ("protocol agent") 209 and a second set of caching agents 202, 204, 206, and 208 that correspond to a second protocol agent 210.

Note that in alternative embodiments, only single separate rings for the AK and AD signals are used. In yet another embodiment, more than 2 rings are used for each of the AK and AD signals. In alternative embodiments, the local network connecting cache and protocol agents may be implemented as a fully connected network instead of a ring. Other alternative embodiments may encompass alternative communication networks between cache and protocol agents implemented in hardware or as a collection of one or more software routines.

Each cache agent of the first set can communicate cache operations such as loads and stores to processing cores (not shown in FIG. 2), and data requests, data write-back operations, cache fill acknowledgements, and snoop response transactions, to the first protocol agent. Likewise, each cache agent of the second set communicates these non-data cache transactions to the second protocol agent. The cache agents may communicate to the protocol agents, in one embodiment, through a series of router circuit (not shown in FIG. 2).

The first and second protocol agents are responsible for arbitrating between the various operations from their respective cache agents such that the operations are managed and completed in a manner consistent with the caching protocol of the caching architecture.

In one embodiment, each cache agent has access to four communication channels (depicted by rings in FIG. 2) 211, 212, 213, 214, upon which caching transactions may be communicated. Each cache agent may communicate cache transactions on any of the four rings illustrated in FIG. 2. In other embodiments, each cache agent may be restricted to a particular ring or group of rings upon which caching transactions may be communicated to/from the cache agent. The cache data that results from the transactions communicated on the rings of FIG. 2 may be communicated among the cache agents on other communication channels (e.g., data bus) not depicted in FIG. 2. Alternatively, in some embodiments the cache data may be communicated on the rings depicted in FIG. 2. Moreover, in other embodiments, each network in FIG. 2 may be configured in other topologies, such as tree topology or a chain.

In the embodiment illustrated in FIG. 2, caching transactions, such as data and/or cache ownership requests, data write-back operations, and snoop responses with data are sent on rings 212 and 214 ("address" rings) and transactions, such as cache fill acknowledgements and non-data snoop responses, such as a cache "hit" or "miss" indication, are transmitted on rings 211 and 213 ("non-address" rings). In other embodiments, the above or other transactional information may be transmitted on other combinations of the rings 211-214. The particular ring assignment for the various cache transactions discussed above and illustrated in FIG. 2 are only one example of the transactions and ring assignments that may be used in embodiments of the invention.

As each set of cache agents communicates information between each other via the protocol agents, an ordering of the information entering the protocol agent can be maintained, in at least one embodiment, such that the correct information will allow correct coherence protocol transitions in the protocol agent at the correct time. In one embodiment, the ordering of information within the networks is maintained by each protocol agent. More specifically, each protocol agent maintains the correct ordering of the various caching operations being performed by temporarily storing the operations as they arrive within each protocol agent and retrieving them in the order in which they arrived in order to produce correct coherence protocol transitions in the protocol agent.

In one embodiment, each protocol agent contains one or more buffers that may be used to store data, commands, or addresses originating from one of the cache agents, which can then be retrieved from the buffers in the proper order to be delivered to a particular cache agent. In the embodiment illustrated in FIG. 2, each protocol agent includes, or otherwise has associated therewith, two first-in-first-out (FIFO) buffers 216, 217, 218, 219 that are each coupled to two of the four rings of FIG. 2. Each pair of rings illustrated can communicate information in a particular direction. For example, rings 211 and 212 can communicate information in a clockwise (CW) direction, whereas rings 213 and 214 can communicate information in a counter-clockwise (CCW) direction. In an alternate embodiment, only a single FIFO is used and only two of the four rings are used.

Figure 3:
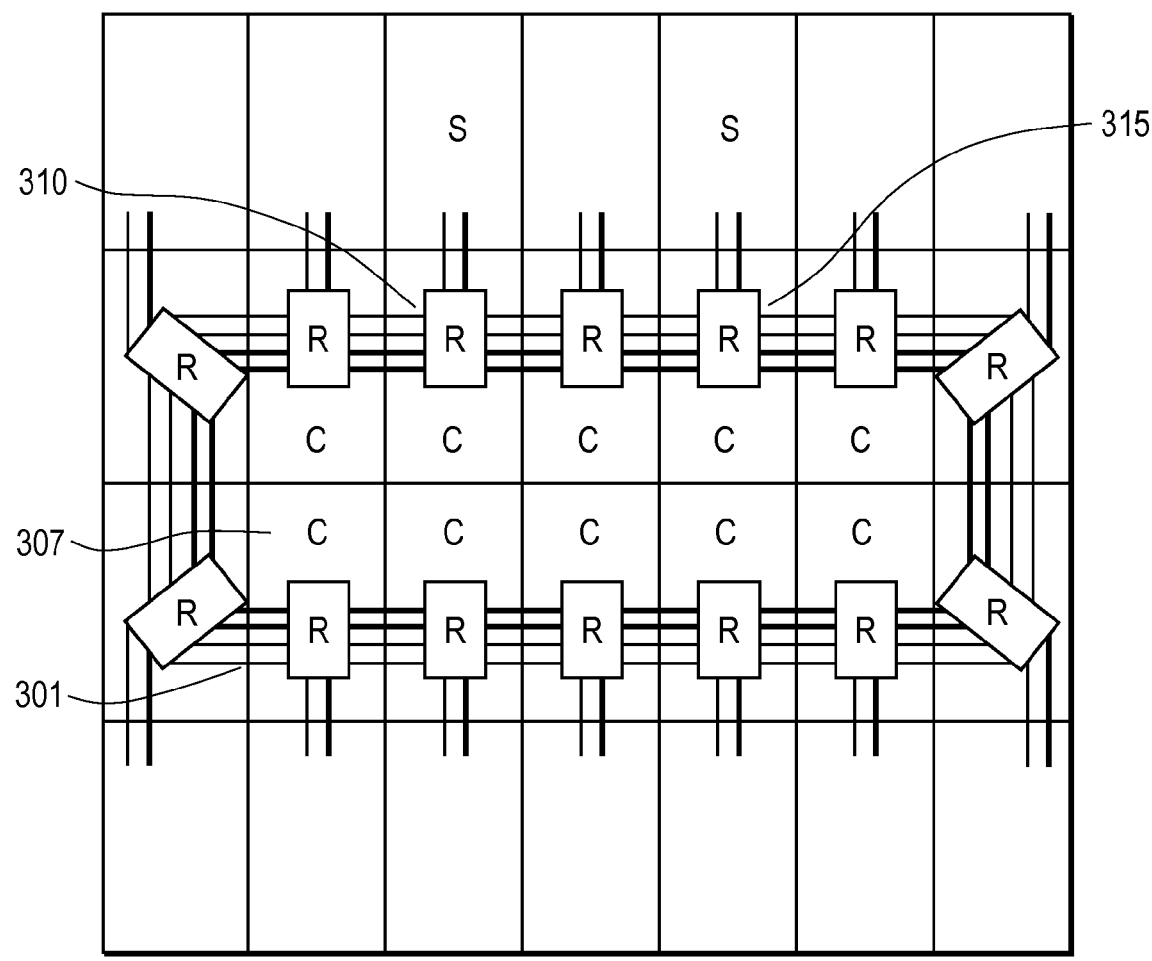
FIG. 3 illustrates a caching architecture including routing circuits according to one embodiment of the invention.

FIG. 3 is a diagram illustrating the ring structure of FIG. 2 in conjunction with various routing circuits, which route data to their intended recipient from each of the cache agents. In particular, FIG. 3 illustrates a number of cache agents, identified by the letter "C", in a ring configuration of two networks, each comprising signals AD and AK to interconnect a cache agent with a protocol agent, identified by the letter "S". A routing circuit, identified by the letter "R", is associated with each cache agent to either route information contained within signals, AD and AK, to the next cache agent within a network (if the next agent in the network is not a protocol agent) or to a protocol agent (if the next agent within the network is a protocol agent).

Two of the routing circuits 310 and 315 couple the rings of the networks in FIG. 3 to the protocol agents, whereas other routing agents connect the rings to other cache agents and other ring networks. In one embodiment, a cache agent 307 may send a signal intended for one of the protocol agents on ring 301 in a clockwise direction. The routing agents between cache agent 307 and the intended protocol agent, moving in a clockwise direction around the ring, propagates the information contained within the signal between them until the signal reaches the routing circuit, 310 or 315, which would route the signal to the intended protocol agent. For example, the signal described above would be retrieved by protocol agent 307 and the information within would be stored in the appropriate FIFO.

After information is stored within the FIFOs of a particular protocol agent, the protocol agent may process the cache events sent by the cache agent in accordance to the coherence protocol by retrieving, or "popping," the information off of the FIFO in the order in which it was stored.

Ordering Rules

As discussed above, because the cache agents (e.g., cache controllers) are separate from the protocol agents, the coherence ordering point is not at the same location, particularly since there is a non-one-to-one mapping between cache controllers and protocol engines with a variable latency Chip Multi Processor (CMP) network, or alternatively a variable latency network on-chip, off-chip, or implemented in software, in between.

More specifically, a cache controller performs cache actions, such as requests, writebacks, snoops, and fills in an internal order, and when applied in a sequence to a single block in the cache, results in the data and state of the block to be updated in the order according to the specific sequence. This ordered sequence of cache events is important to correctly implement the coherence protocol. For instance, in one embodiment, the communication of correct cache ordering allows snoop responses and new requests to be seen in the correct order by the detached protocol engine, providing it the visibility into the internal ordering at the cache controller for these events, to ensure that a snoop doesn't incorrectly get reordered behind a request and become blocked as specified in one embodiment of a coherence protocol.

The cache ordering point is where cache events, such as snoops, request, writebacks, and fills, are ordered with respect to one another. The coherence ordering point is where coherence decisions are made from events specifically necessary to implement the protocol state transitions. These events include the cache events set forth herein, which are brought into the protocol agent in the correct cache event ordering via the pre-coherence channel, along with external coherence events, which reflect the communication of the coherence view from other protocol agents in the system.

In one embodiment, the cache ordering point is made to appear as if it's located inside the protocol agent, which is located apart from the cache controller. To do that, information contained in the cache agent's ordering point is shifted into the coherence ordering point via the pre-coherence channel. That is, the pre-coherence channel gives a protocol agent a view into the internal ordering at the cache agents, allowing the protocol agent to function in a detached way without violating coherence rules in the coherence protocol. In one embodiment, the pre-coherence channel consists of an ordered mechanism to transport cache events from the cache agent into the protocol agent, and includes recovery and ignore mechanisms to allow a consistent coherence view of the system. The pre-coherence channel also includes a mechanism where resource dependencies are resolved by blocking the pre-coherence channel or moving the blockage to another FIFO to unblock the pre-coherence channel.

In one embodiment, the pre-coherence channel is implemented as a virtual ordered route by which cache specific information is communicated from the cache agent into the specific logic that maintains the system interface's coherence ordering point, which is a request inflight table referred to herein as the Missing Address File (MAF), located in the protocol agent. Physically, this virtual route is implemented as the CMP network, and egress and ingress buffering on either side of the network within the cache and protocol agents respectively leading from the cache control logic to the MAF. The CMP network is the link and physical layers of the an on-chip communication consisting of the CMP address, acknowledgement, and data networks, between cache agents, processors, and protocol agents, shown as the collective of the bus network and its routing components in FIG. 3.

In one embodiment, the protocol agent has two pipelines: one of the system interface-bound path and one for the CMP-bound path. The one for the system interface path consists of request and snoop responses that operate on the Missing Address File (MAF) structure, which is the unit most responsible for enabling the separation between the cache agents and the protocol agents while maintaining ordering. The MAF provides a single point of ordering from the system interface perspective, which allows for conflict resolution. In one embodiment, the MAF exclusively keeps track of state information required for coherence completion of transactions, snoop blocking, and for manipulating in-flight data from cache controllers. The CMP-bound path consists of structures that handle snoops and responses. A Probe Queue (PRQ) structure provides a mechanism to block and replay snoops wherein the decision to do so is controlled via the MAF, as required by one embodiment of the protocol.

In one embodiment, the following message types communicate the ordering point from the cache controller into the system interface: requests, writebacks, data (fill) acknowledgements, and snoop responses. These messages come into the protocol agent as a single input stream of events. From the dependency point of view, in one embodiment, they are classified into three types: simple flow dependency, cyclic resource dependency, and acyclic resource dependency.

For a simple flow control dependency, data acknowledgement and snoop responses do not require allocation of a resource in order to be consumed. In one embodiment, they both could potentially create home channel messages, which are sunk in preallocated buffers in the home node of the system, without requiring additional dependency aside from message flow control. (The home node may be part of the memory controller in a system responsible for handling the semantics of the transactions that the memory controller deals with over the network connecting each of the processors in the system to the memory controller, and these transactions are used to implement a coherence protocol in which these processors and the home node coupled with the memory controller jointly participate.)

For a cyclic resource dependency, requests depend on the allocation of a resource. In one embodiment, because resource sharing (as opposed to resource division) is allowed, a request may not have a free MAF entry to allocate. In order to make room for allocation, another entry needs to retire, and for that to occur, snoops need to make forward progress. If a request is blocking the input event stream, then snoop responses behind the request are prevented from making forward progress. As long as snoop responses are blocked, the protocol agent cannot complete requests, and request entries in the MAF will not retire, which is a deadlock condition. Request allocation depends on request forward progress, which depends on snoop forward progress, which depends on the event stream making forward progress, which is blocked by the request. In one embodiment, a cyclic resource dependency is resolved by moving blocked requests into another buffer, freeing the input events that were blocked behind it.

For an acyclic resource dependency, writeback transactions also have a resource dependency on allocation into the MAF. While waiting on a MAF entry to become available, the input stream from the cache agent is also blocked. However, this is a benign resource dependency because writeback forward progress is not dependent on the any messages behind it, namely, a snoop response message following it from the cache agent. As long as there is a reserved writeback allocation path into the MAF, writebacks can achieve still forward progress even by blocking the input event stream.

Figure 4:
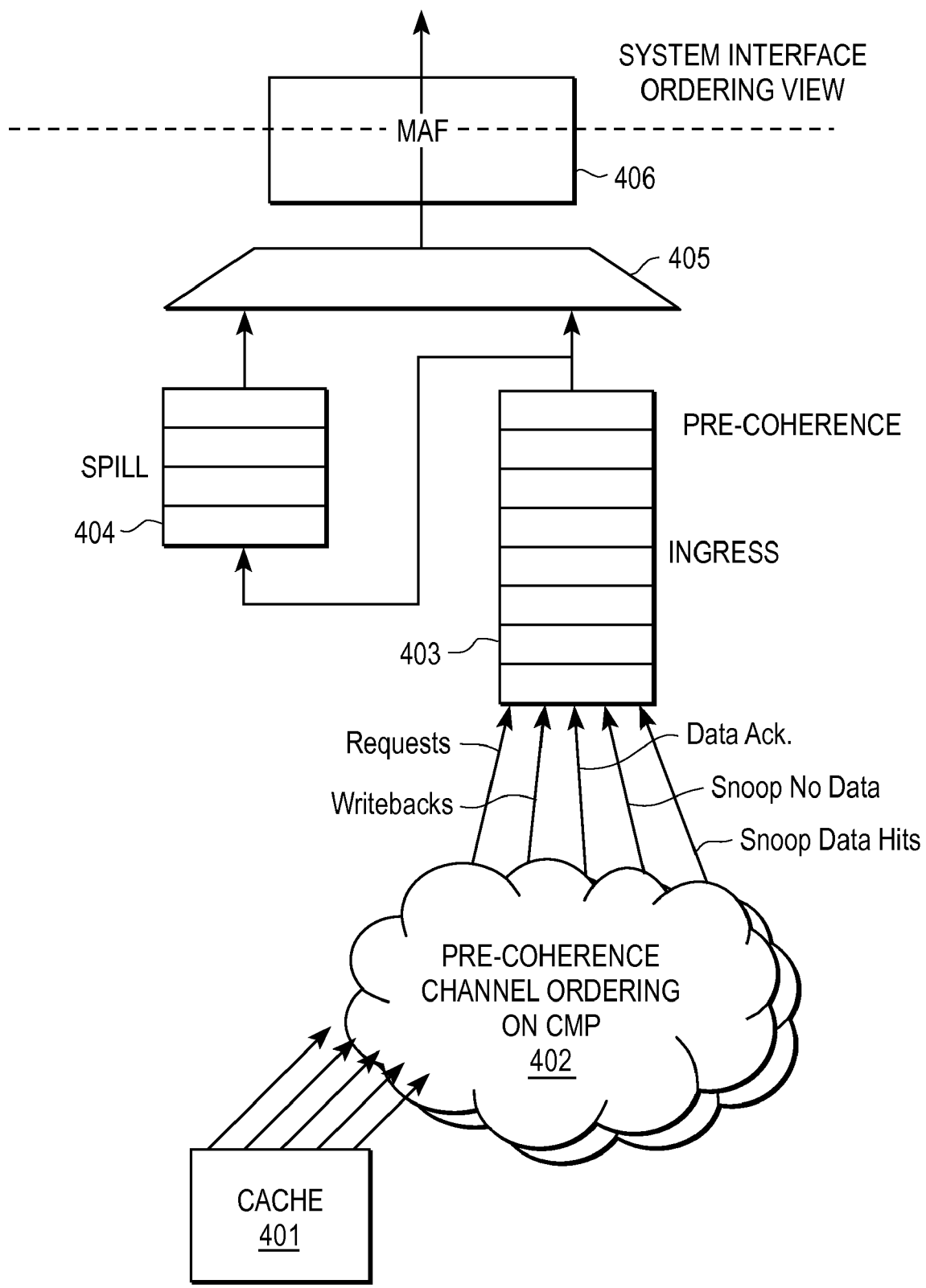
FIG. 4 illustrates a block diagram of one embodiment of message ordering logic to accommodate the various message types while ensuring proper ordering.

FIG. 4 is a block diagram of one embodiment of message ordering logic to accommodate the various message types while ensuring the proper ordering of the cache coherency events. In one embodiment, this logic is in the protocol logic. The ordering logic uses two separate FIFOs and includes the MAF.

Referring to FIG. 4, an incoming stream of events is impact into ingress queue (e.g., FIFO) 403. Such events are received from the pre-coherence channel ordering interface (e.g., rings) between the one or more protocol agents and one or more caches (e.g., cache agent 401) in the sets of caches. These events are received in the form of messages that include requests, writebacks, data acknowledgements, snoop no data messages, and snoop data messages.

The head of ingress FIFO 403 is coupled to one input of arbiter 405. In one embodiment, only the head of ingress FIFO 403 is allowed to arbitrate for input into MAF 406. In one embodiment, non-request events are allowed to block at the head of ingress FIFO 403 while waiting for resources, but if a request is at the head of ingress FIFO 403 and blocked, it is moved into spill FIFO 404 instead, thereby allowing the stream of events following it in ingress FIFO 404 to proceed to avoid deadlock. In one embodiment, the move is done by obtaining an issue slot by doing a poison issue when not all the resources are available. The poison issue is one which is interpreted as a nop elsewhere, but enables allocation into spill FIFO 404.

In one embodiment, spill FIFO 404 is preallocated with the total number of requests from all cache agents from which the protocol agent can receive. In one embodiment, unallocated requests have one way pre-coherence ordering with respect to the other messages. Thus, an unallocated request cannot shift forward in the pre-coherence channel but is allowed to move backwards. In other words, the protocol agent pretends the cache agent request was sent later than it was with respect to snoops following it. Additionally requests are out-of-order with respect to each other. Subsequently, arbiter 405 arbitrates between the outputs of ingress FIFO 403 and spill FIFO 404 for access to MAF 406.

Thus, from the dependency point of view, requirements are made on the reordering of requests in comparison to all other events in the pre-coherence channel ordering. In these reordered cases, reordering is done on the pre-coherence channel where it would not have been allowed in at the system interface. These happen in cases where either the protocol agent is able to recover, or the reordered perception of events do not force the cache and coherence agents to diverge. For more information on one embodiment of the ordering, see Ser. No. 11/221,616, entitled "Precoherence Channel," filed and assigned to the corporate assignee of the present invention.

In one embodiment, ingress FIFO 403 and spill FIFO 404 in the system interface could be part of the CMP network. All requests, writebacks, snoop responses, and data acknowledgements are explicitly made ordered in the FIFO, even though the pre-coherence channel does not require all of them to be ordered. Request dependency is fixed through spill FIFO 404, which then allows requests to be unordered amongst requests to take advantage of request-to-request out of orderness.

In one embodiment, spill FIFO 404 is not included and ingress FIFO 403 buffers all cache coherence events, provided cyclic resource dependency across requests is resolved in an alternative way. In such a case, arbiter 405 is not necessary.

Once into the protocol agent, all messages are stored into ingress FIFO 403 in the order received, which is the order the cache agent intends. No further reordering of messages occur in ingress FIFO 403 as they are pulled out and sent to be issued into MAF 406 in order under control of arbiter 405. The out-of-orderness introduced on the ring network, but still complying to the pre-coherence channel ordering, is reflected in ingress FIFO 403, along with request out-of-orderness, which is introduced local to the system interface at the FIFO 404, through arbiter 405 across the FIFOs into MAF 406. From that point on, messages travel on the coherence channel on or off-chip between protocol agents in the system.

MAF 406 receives completion messages, according to one embodiment of a coherence protocol, to retire pending coherence transactions stored in its entries. These are received from the home node and may include completion only (Cmp) and completion-forward (CmpFwd) messages. The latter is in the form of an explicit extraction command attached to a normal completion.

Early Issue of Transaction ID

In one embodiment, a transaction is uniquely identified within the system at a given time using a requester node ID (RNID), a transaction ID (TID) and the home node ID (HNID) that the transaction is targeting. The HNID enables the transaction to be distinguished from other requests may be inflight within the system from different requestor nodes. Within the requestor agent, a transaction may be uniquely identified using the request inflight table (e.g., MAF) entry ID. Thus, each packet output from the MAF includes a HNID, a RNID and a TID. These are generated in the protocol agent and are inserted into the packet that is output from the MAF.

In one embodiment, the set of usable TIDs is shared across a RNID and HNID pair, instead of across a RNID alone. A new request allocates into the request inflight table at the requestor node itself with a transaction ID that corresponds to the target, which is the home node. The transaction ID corresponds to a preallocated home buffer at the home node where the request can be entered. Sets of TIDs are grouped in pools indexed by the HNID or groups of HNIDs, and are assigned independently to transactions targeting different HNIDs or groups of HNIDs. A free list is associated with each pool as well as a credit counter that includes a count indicative of resource availability for each pool. In one embodiment, eight pools of TIDs are used, which includes eight sets of credit counters and free lists. In one embodiment, the home nodes within the system are aliased into these eight home sets using three bits of the HNID.

The HNID is produced as an output of the source address decoder pipeline. In a case where the source address decoder pipeline consists of four cycles, these four cycles occur before the HNID is available. The TID allocation logic selects the TID based on the HNID. Therefore, any delay or cycle time to produce HNID prevents the allocation logic from correctly selecting from the corresponding TID arbitration pool until the HNID is available. In one embodiment, once resource availability allows issuance of a transaction into the request inflight table (e.g., MAF), a free list operation reads the free list for the corresponding TID pool from an array, performs find-first arbitration to select an ID, and updates the free list to be written back to the array. This comprises of another three cycles associated with logic and wire delays. Also, bypass logic could be used to pipeline it for back-to-back allocations into the same pool. In addition, the MAF pipeline (consisting of the MAF frontend and backend) does not start until issue in this scheme and may take yet another two cycles to perform conflict and merge detection before the selected TID is ready to be consumed. In one embodiment, this could overlap with the TID pipeline.

Figure 5:
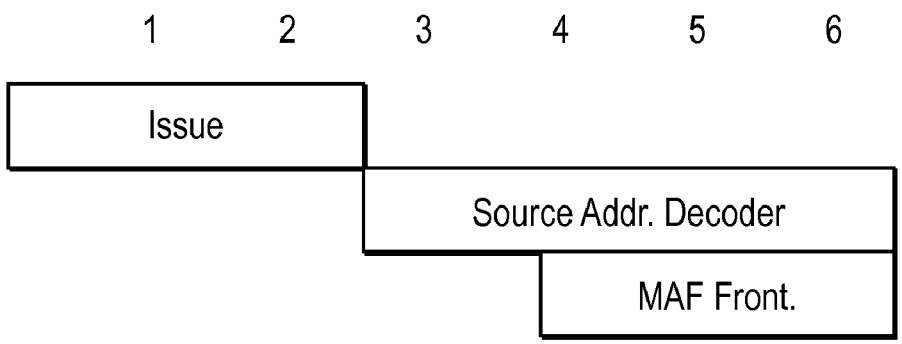
FIG. 5 is a timing diagram illustrating generation of transaction IDs with respect to other portions of a transaction processing pipeline.

In one embodiment, the four cycle source address decoder pipeline proceeds in parallel with the two cycle MAF frontend pipeline through issue speculation, while all three cycles of the TID pipeline is hidden through a network of bypasses, buffering, and free list pre-calculation. FIG. 5 illustrates a pipeline for one embodiment of the request pipeline. Referring to FIG. 5, the issue stage for the request takes the first two cycles. Following the two cycle issue stage, the source address decoder generates the HNID in four cycles. After the four cycles, the MAF front end performs its functions (e.g., free list allocation). As is shown in FIG. 5, the TID allocation is absent because it occurs in parallel with the operation of the source address decoder and MAF front end.

The MAF frontend logic is overlapped with the source address decoder. This is accomplished by moving issue ahead of the source address decoder. However, doing that means issue will occur before the HNID result is known, so that it could be used to allocate from the correct TID pool corresponding to that HNID. This means that there is a speculative issue. The TID allocation latency is also reduced from three cycles to zero.

Figure 6:
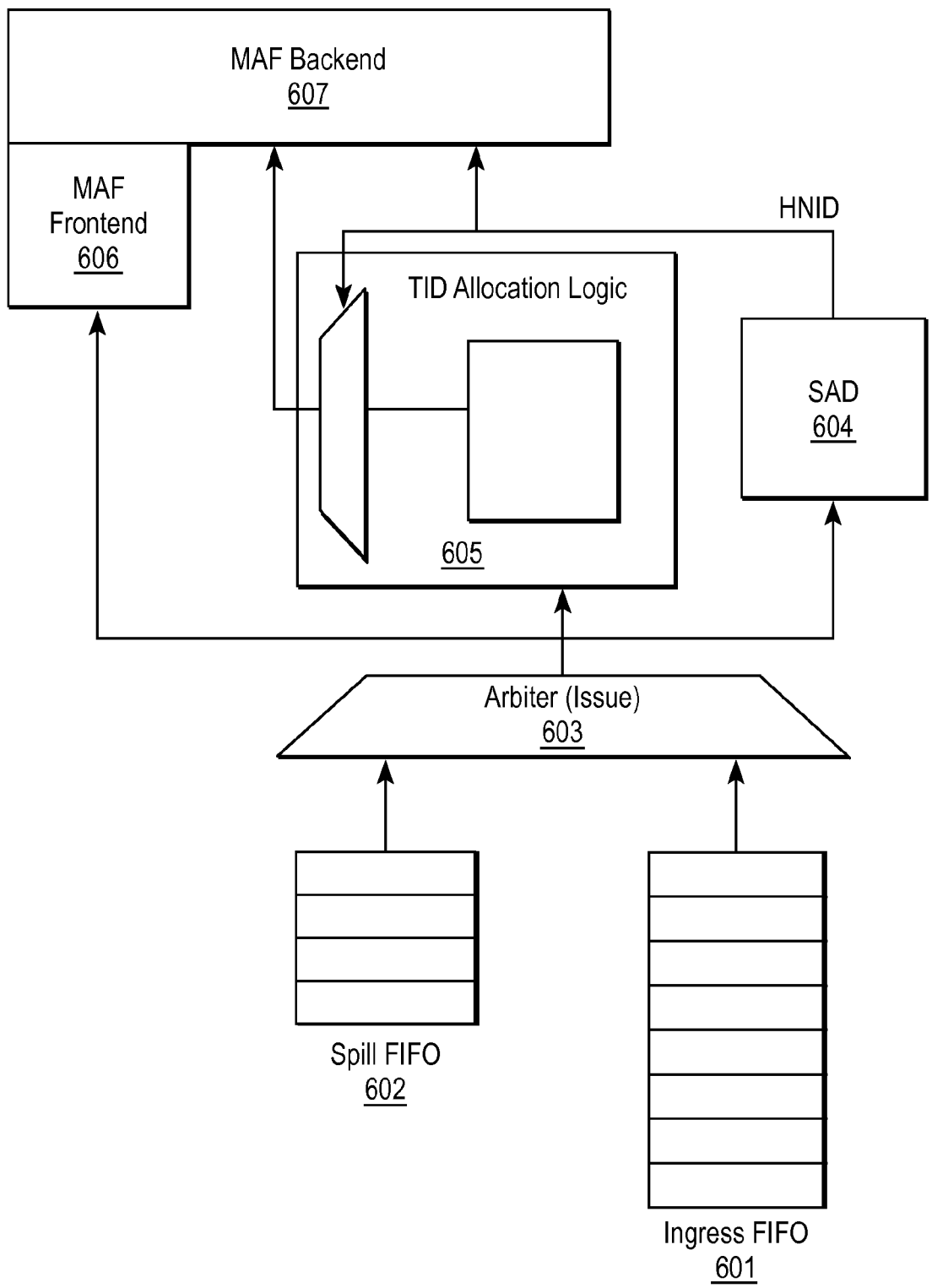
FIG. 6 is a block diagram of one embodiment of a protocol agent.

FIG. 6 is a more detailed block diagram of a protocol agent. Referring to FIG. 5, ingress FIFO 601 and spill FIFO 602 are coupled to inputs of arbiter 603 that selects one entry from the two. The selection occurs during the issue stage. The output for the selected entry is coupled to an input of source address decoder 604, an input of the transaction ID allocation logic 605, and an input of MAF front end 606. In response to the output of arbiter 603, source address decoder 604 determines the home node ID (HNID). SAD 604 outputs the HNID to MAF backend 607 and transaction ID allocation logic 605.

In response to the HNID, TID allocation logic 605 allocates a transaction ID (TID). TID allocation logic 605 performs the TID calculation using pools of available transactions IDs for each HNID or HNID group. In one embodiment, TID allocation logic 605 pre-selects one or more TIDs for each possible HNID or HNID group, and the HNID output from SAD 604 is used to select one TID as an output of the TID allocation logic 605 based on the actual HNID. In one embodiment, the selection logic in TID allocation logic 605 expends three cycles to get the next ID before it may be used, so to compensate, three TIDs are pre-selected in each pool, so that even when there are issues from consecutive matching pools, the pre-selection logic is designed to provide one new TID for each HNID every cycle. TID allocation logic 605 has an output coupled to an input of MAF backend 607 for sending the TID to MAF backend 607.

In essence, TID allocation logic 605 and SAD 606 operate in parallel, as opposed to in series. In one embodiment, operating TID allocation logic 605 and SAD 604 in parallel hides an additional three cycles of latency that would exist had TID allocation logic 605 and SAD 604 operated in series and TID allocation logic 605 had to wait to perform the entire allocation process until after HNID generation.

MAF front end 606 performs conflict detection independent of the HNID. In one embodiment, conflict detection is performed by using content address matching (CAM) to determine if a request address matches a pending transaction. The conflict detection may also involve snoop responses. Thus, MAF front end 606 determines if a MAF entry should be allocated independent of the HNID and selects the entry for the transaction.

Once MAF back end 607 receives the HNID and the TID, MAF backend 607 writes the TID into a MAF entry for use with other messages. Using the HNID and TID, MAF backend 607 constructs a packet and sends it out to the system interface.

In the TID allocation logic, the TID pool is unknown before the source address decoder outputs a HNID. Also at the time before the SAD outputs a HNID, it is not known whether credits are available in the TID pool corresponding to the transaction. Speculative issue is done by sending the transaction events into the pipeline without knowing the home set. All TID pool counters in the TID allocation logic are speculatively decremented during issue and after the source address decoder pipeline, and all TID pools that do not correspond to the HNID output by the SAD will have their credits added back. Credit availability in the TID pools guarantees that the correct TID pool has available credit to proceed.

Depending on the type of event requesting TID allocation, an event may be rejectable or non-rejectable. If no other event in a stream depends on the acceptance of an earlier event, the earlier event is rejectable. Events can be taken out of order to make way for later events that do not require a credit resource, in this case, the TID credit resource from the corresponding pool, and re-issue out-of-order with respect to them. However, if dependency is required, the event is non-rejectable. In one embodiment, a non-rejectable event is handled by acquiring legal credit readiness of all TID pools, that is, all TID pools must have credit availability, so that regardless of the outcome of the HNID output, its issue into the pipeline cannot fail. In other words, the event is posted into the pipeline, allowing later events to also proceed into the pipeline knowing the earlier one cannot be failed. In one embodiment, all TID pools are speculatively decremented until the correct pool is determined, so that all other TID pools that were incorrectly decremented during issue are corrected. In cases when one or more TID pools resources are unavailable, the non-rejectable event is stalled until all TID pools have at least one credit for issue. In another embodiment, non-rejectable events are not posted. Speculative decrementing does not occur, the non-rejectable event is issued, and dependent events are stalled and prevented into the pipeline until the HNID is known, and can be used to determine if credits are available in the TID pool for the issue to succeed. This shifts the pipeline into single-issue mode when it encounters a non-rejectable event requiring a TID resource. In another embodiment, posting and single-issue may be mixed for non-rejectable events, such that posting is always attempted for non-rejectable events when all TID pools have available resources, and single-issue is attempted for non-rejectable when one or more TID pools is out of resources.

In an embodiment with both dependent and independent events, request allocation is independent and can be delayed, and are thus rejectable. Writebacks, on the other hand, must not become out of order because of dependency with succeeding events, and are thus non-rejectable. When a request issue cannot speculatively obtain all TID pool credits (i.e. it does not have credit into one of the TID pools), it does not pass credit readiness. No credit is decremented, and the request poison-issues into the pipeline, causing it to be emptied from the event stream into the reissue buffer known as the request spill FIFO, and while doing so, the source address decoder pipeline returns the correct HNID to be used for non-speculative issue later. Writeback cannot be poison-issued. Instead, they are blocked until readiness is achieved in all TID pools to be issued into the pipeline posted. In an alternative embodiment, the writeback transaction is single-issued through the sourced address decoder to determine the HNID for non-posted issue. In another alternative embodiment, writebacks are issued posted into the pipeline when TID resources are available in all pools, and are single-issued when one or more TID pools do not have resources.

The performance impact of speculative issue is that because IDs from incorrect TID pools are taken out, they cannot be allocated for subsequent events that could potentially see them available. However, this effect is only temporary, as the credit is readjusted when the source address decoder pipeline supplies the correct HNID. This means as long as the free credits in the TID pool remain above the source address decoder pipeline depth, no performance impact will be felt, and even if any one counter goes below, the impact will be negligible, as back-to-back allocations are caused by workloads that skew towards a small number of TID pools.

In one embodiment, TID allocation latency as observed by incoming requests is reduced from three cycles to zero. This is done by pre-calculation of the next available TID from each pool and keeping it immediately available for use. The latency through the TID allocation logic appears like a single 8-to-1 multiplexer where the selection is the HNID. This fits into the MAF pipeline so the multiplexer does not add additional cycle delay to the MAF pipeline. The set of bypass network and buffers to cover the three cycle latency to generate the next TID is hidden to refill into the first pre-calculation buffer at the rate of one per cycle, to allow back-to-back TID allocation into the same pool.

Figure 7:
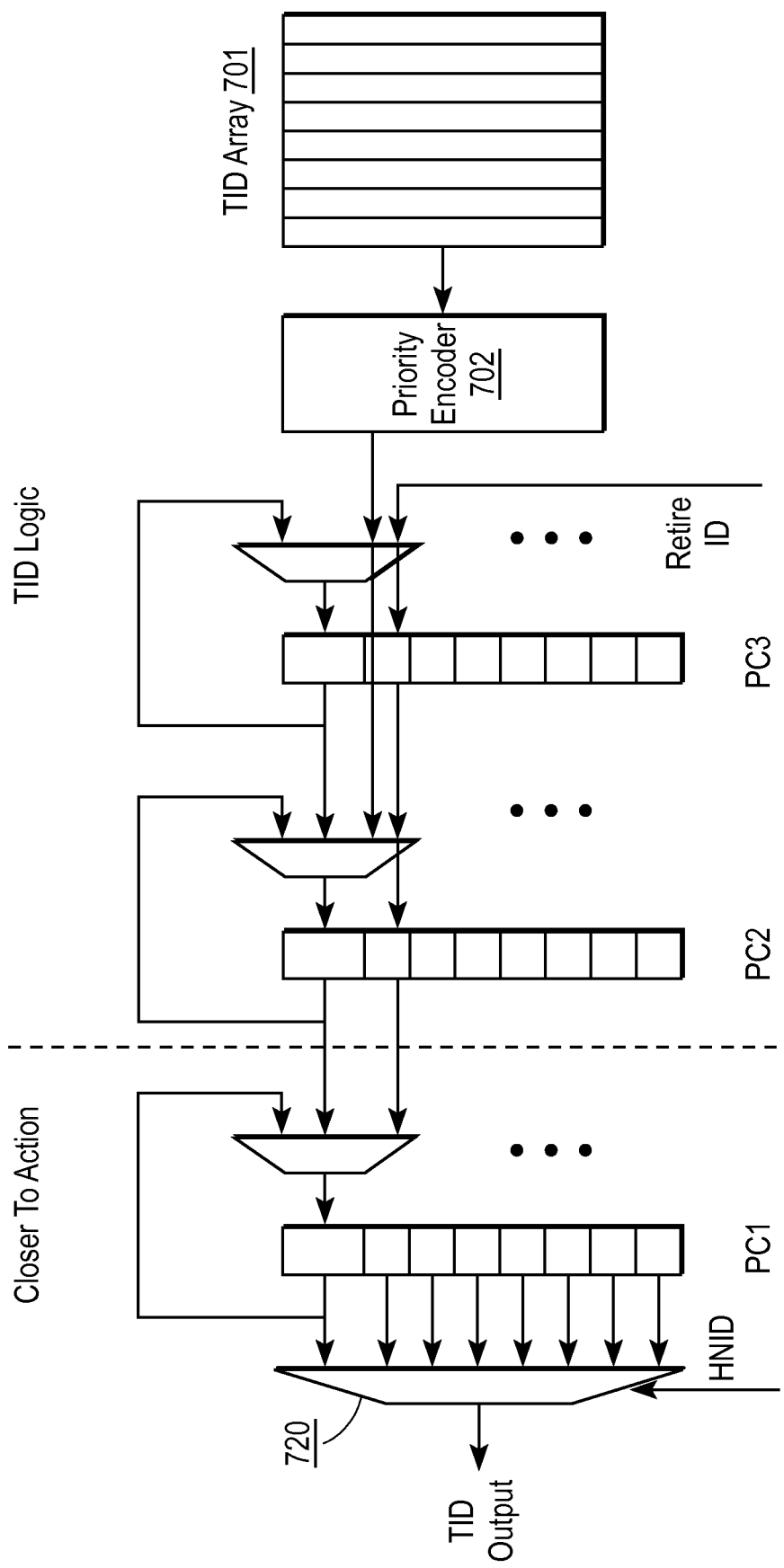
FIG. 7 is one embodiment of a transaction ID allocation logic.

FIG. 7 is one embodiment of the TID allocation logic. Referring to FIG. 7, the TID allocation logic generates three sets of pre-calculated TID values to cover the three cycles for the next TID to be generated from the array based free list and for it to be bypassed to pre-calculated buffers, PC1, PC2 and PC3. Each of the set of pre-calculated buffers stores available TIDs, one of each HNID or HNID group corresponding to a TID pool. In other words, the next three TID values in the future are already figured out in advance in each TID pool. The bypass network consisting of multiplexers just shifts IDs in and out of these pre-calculation buffers. When the first pre-calculated TID is output from an entry in PC1 as selected by the multiplexer, it starts a three cycle process in which the array free list entry is the TID array 701 of FIG. 7 corresponding to the TID pool is read out. Then, a priority encoder 702 is used to select the next ID to be supplied to a pre-calculated buffer or bypassed to a transaction using a find-first-set (FFS) in a vector followed by an encoder, and the updated free list cleared of the selected entry is written back to the array. The read-modify-write process is fully pipelined by bypassing the free list in consecutive allocations to the same pool, and is able to sustain the throughput of one new TID per cycle after the initial latency of three cycles is covered. This means the first three consecutive allocations to the same pool will drain out all the pre-calculated TIDs for that pool, before the next one is supplied from the free list. After that, steady state operation is achieved until eventually requests stop coming in and the pre-calculated IDs can be filled back in. Noted that more or less pre-calculation buffers may be used to ensure more than 3 or less than 3 consecutive allocations from the same pool may be possible.

In one embodiment, retiring entries return TIDs to the pre-calculated buffers first, before being returned to the free list, using the retire ID input. This is used in cases where the buffers are partially empty.

In one embodiment, the TID logic assumes a retire and an allocation do not occur at the same cycle. The three cycle TID pipeline latency is divided into two cycles to cover the read and priority encode at the free list to create the next TID, and these are overlapped by pre-calculation buffers, PC2 and PC3. One cycle is to cover transport latency from PC2 to PC1. The 8-to-1 multiplexer 720 is used in the direct path of the incoming HNID to reduce latency. The transport latency allows PC2, PC3, and the free list to be insensitive to the floorplan.

The following logic pseudo-code describes the memory in which allocation and retire affect the pre-calculated buffers and the free list.

```
// pre-calculated buffer1 (PC1) algorithm
IF (current cycle allocation)
    IF (PC2_valid)
        PC1_value = PC2_value
```

-continued

```
            PC1_valid = 1
        ELSE
            PC1_value = invalid
            PC1_valid = 0
    ELSE IF (retire AND !PC1_valid)
        PC1_value = retire_value
        PC1_valid = 1
    ELSE
        PC1_value unchanged
        PC1_valid unchanged
// pre-calculated buffer 2 (PC2) algorithm
IF (two consecutive cycle allocations)
    IF (free list non-empty)
        PC2_value = FreeList_pick_value
        PC2_valid = 1
    ELSE IF (free list empty AND PC3_valid)
        PC2_value = PC3_value
        PC2_valid = 1
    ELSE
        PC2_value = invalid
        PC2_valid = 0
ELSE IF (current cycle allocation)
    IF (PC3_valid)
        PC2_value = PC3_value
        PC2_valid = 1
    ELSE
        PC2_value = invalid
        PC2_valid = 0
ELSE IF (retire AND !PC2_valid AND PC_1 valid)
    PC2_value = retire_value
    PC2_valid = 1
ELSE
    PC2_value unchanged
    PC2_valid unchanged
// pre-calculated buffer 3 (PC3) algorithm
IF (last cycle allocation)
    IF (free list non-empty)
        PC3_value = FreeList_pick_value
        PC3_valid = 1
    ELSE
        PC3_value = invalid
        PC3_valid = 0
ELSE IF (retire AND !PC3_valid AND PC2_valid)
    PC3_value = retire_value
    PC3_valid = 1
ELSE
    PC3_value unchanged
    PC3_valid unchanged
// free list (FL) algorithm
IF (allocation AND free list non-empty)
    FreeList_pick_value = priority encoder output of free list
    Clear corresponding free list bit
ELSE IF (retire AND PC3_valid)
    Set corresponding free list bit
ELSE
    Free list value unchanged
```

Examples of Computer Systems

Figure 8:
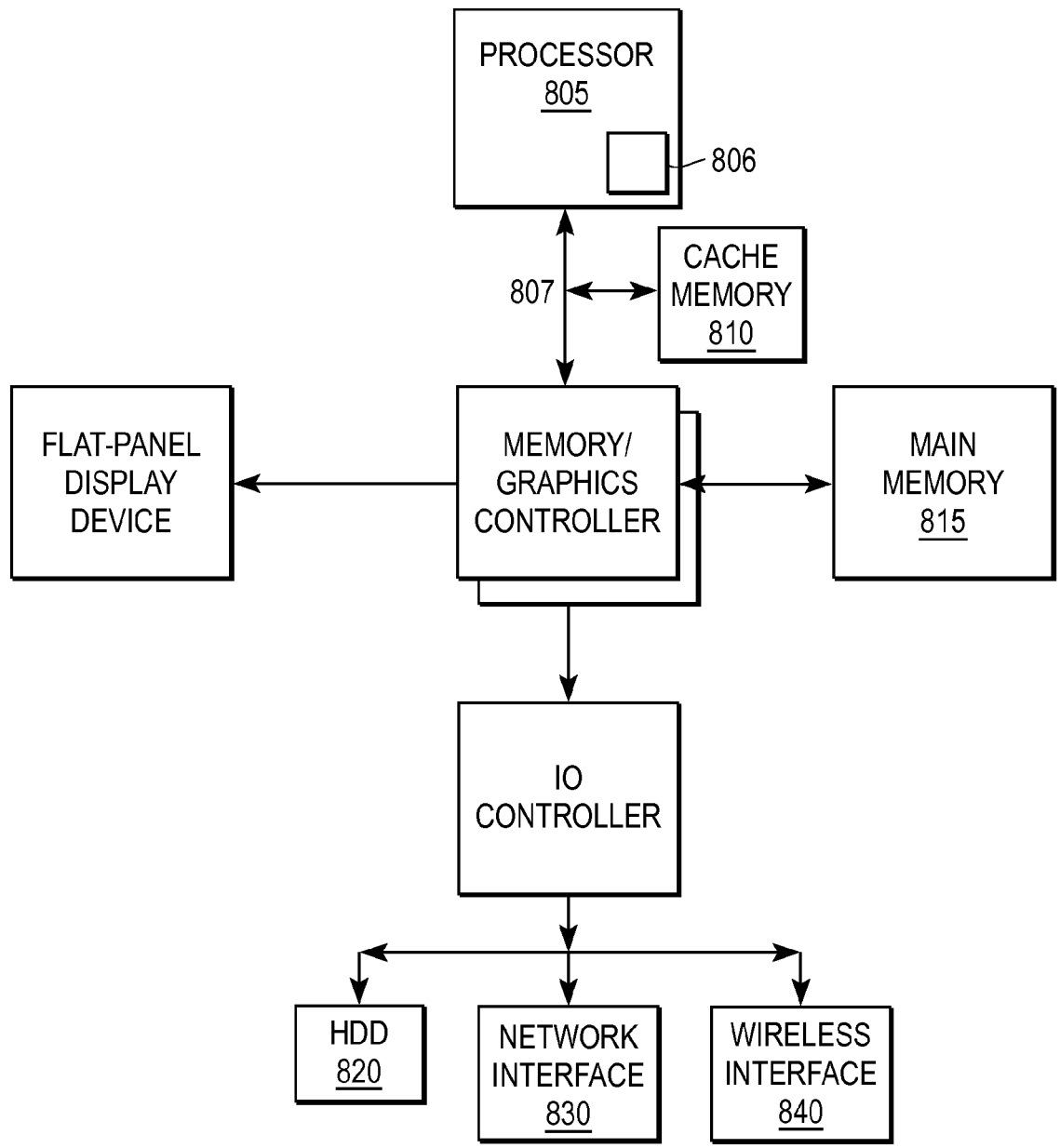
FIG. 8 illustrates a front-side-bus (FSB) computer system in which one embodiment of the invention may be used.

FIG. 8 illustrates a front-side-bus (FSB) computer system in which one embodiment of the invention may be used. A processor 805 accesses data from a level one (L1) cache memory 810 and main memory 815. In other embodiments, the cache memory may be a level two (L2) cache or other memory within a computer system memory hierarchy. Furthermore, in some embodiments, the computer system of FIG. 8 may contain both a L1 cache and an L2 cache.

Illustrated within the processor of FIG. 8 is one embodiment 806. The processor may have any number of processing cores. Other embodiments, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 820, or a memory source located remotely from the computer system via network interface 830 containing various storage devices and technologies. The cache memory may be located either within the processor or in close proximity to the processor, such as on the processor's local bus 807.

Furthermore, the cache memory may contain relatively fast memory cells, such as a six-transistor (6T) cell, or other memory cell of approximately equal or faster access speed. The computer system of FIG. 8 may be a point-to-point (PtP) network of bus agents, such as microprocessors, that communicate via bus signals dedicated to each agent on the PtP network. Within, or at least associated with, each bus agent may be at least one embodiment of invention 806. Alternatively, an embodiment of the invention may be located or associated with only one of the bus agents of FIG. 8, or in fewer than all of the bus agents of FIG. 8.

Figure 9:
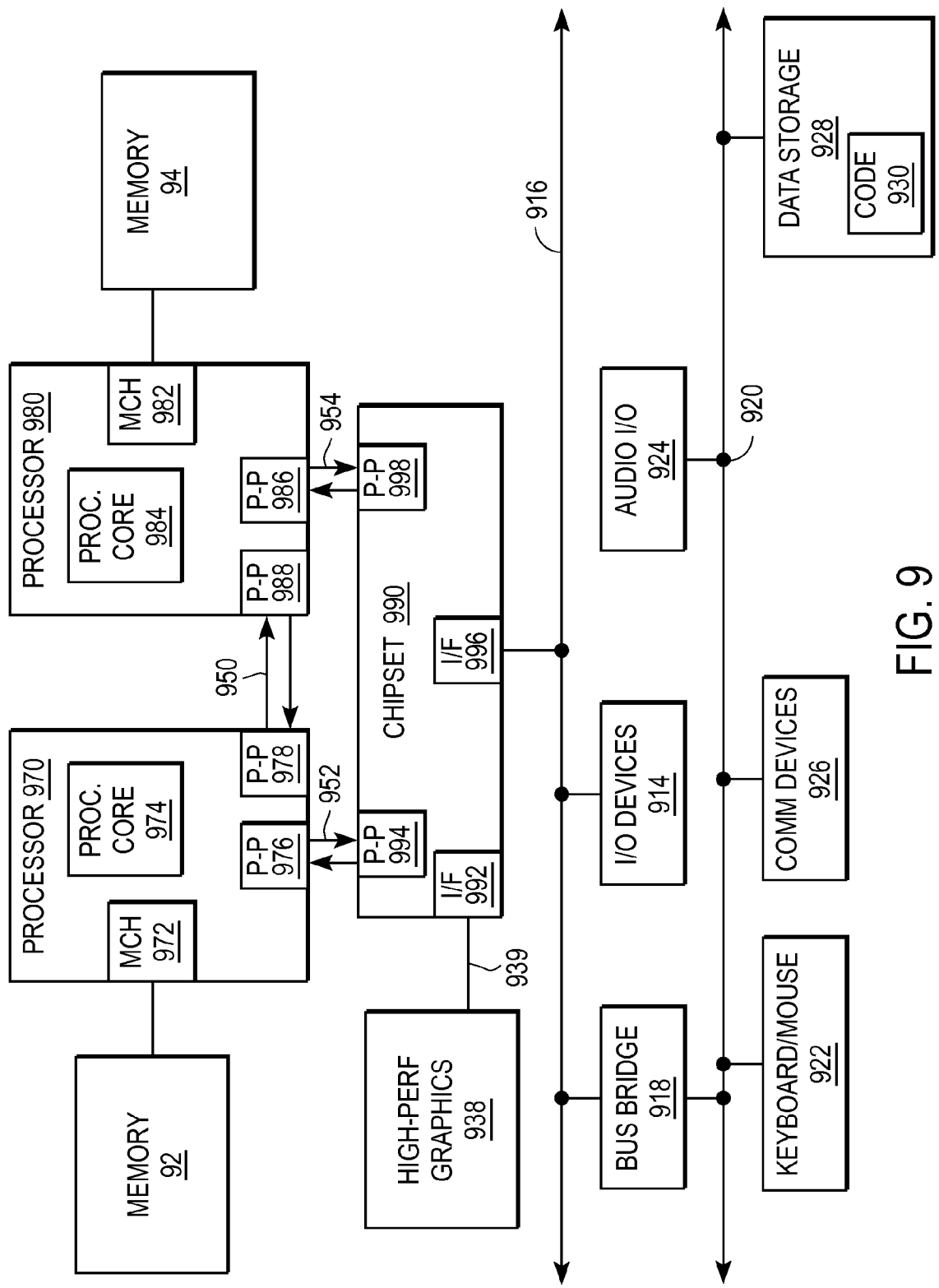
FIG. 9 illustrates a computer system that is arranged in a point-to-point (PtP) configuration.

FIG. 9 illustrates a computer system that is arranged in a point-to-point (PtP) configuration. In particular, FIG. 9 shows a system where processors, memory, and input/output devices are interconnected by a number of point-to-point interfaces.

The system of FIG. 9 may also include several processors, of which only two, processors 970 and 980 are shown for clarity. Processors 970 and 980 may each include a local memory controller hub (MCH) 972 and 982 to connect with memory 22, 24. Processors 970 and 980 may exchange data via a point-to-point (PtP) interface 950 using PtP interface circuits 978 and 988. Processors 970 and 980 may each exchange data with a chipset 990 via individual PtP interfaces 952 and 954 using point to point interface circuits 976, 994, 986 and 998. Chipset 990 may also exchange data with a high-performance graphics circuit 938 via a high-performance graphics interface 939. Embodiments of the invention may be located within any processor having any number of processing cores, or within each of the PtP bus agents of FIG. 9.

Other embodiments of the invention, however, may exist in other circuits, logic units, or devices within the system of FIG. 9. Furthermore, other embodiments of the invention may be distributed throughout several circuits, logic units, or devices illustrated in FIG. 9.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:

a decoder to generate a first node ID indicative of the destination of a cache transaction from a caching agent;
a transaction ID allocation logic coupled to and operating in parallel to the decoder to pre-select one or more transaction IDs for each possible first node ID and then to select a transaction ID (TID) for the transaction based on the first node ID;
a packet creation unit to create a packet that includes the transaction, the first node ID, the TID and a second node ID corresponding to the requestor.

2. The apparatus defined in claim 1 wherein the TID allocation logic comprises:
a memory to store a plurality of pools of TIDs;
a plurality of buffers, each of the plurality of buffers to store a plurality of TIDS, wherein the plurality of TIDs include one from each of the plurality of pools; and
a multiplexer coupled to one of the plurality of buffers and having a selection input coupled to receive the first node ID, the multiplexer outputting one of the plurality of TIDs selected based on the first node ID.

3. The apparatus defined in claim 2 wherein each of the plurality of buffers store one pre-selected TIDs speculatively chosen from each pool.

4. The apparatus defined in claim 2 further comprising bypass logic associated with each location of each buffer, the bypass logic having a plurality of inputs and an output coupled to provide each buffer location with a TID, the plurality of inputs of one or more of the buffers being coupled to a feedback of the TID from an output of the buffer location and an output of another of the buffers.

5. The apparatus defined in claim 4 wherein one of the plurality of inputs is coupled to receive a recently retired TID to enable reuse of the recently retired TID.

6. The apparatus defined in claim 1 wherein both the decoder generates the first node ID and the allocation logic generates the TID in response to receiving the transaction.

7. The apparatus defined in claim 6 further comprising an arbiter coupled to the decoder and the allocation logic to provide the transaction.

8. The apparatus defined in claim 1 wherein the first node ID is a home node ID.

9. The apparatus defined in claim 1 wherein the packet creation unit comprises an inflight table.

10. A method comprising:
speculatively allocating transaction identifiers (TIDs) for a cache transaction from one or more caching agents while generating a first node ID indicative of a destination of the cache transaction;
selecting one of the plurality of TIDs in response to the first node ID; and
forwarding the cache transaction in a packet with the one TID and the first node ID.

11. The method defined in claim 10 further comprising:
generating a plurality of TID values, wherein the plurality of TIDs include one from each of a plurality of pools, each of the plurality of pools being associated with a different node or group of nodes; and
storing the plurality of TID values in a plurality of buffers, wherein each of the plurality of buffers stores one TID value for each of a plurality of nodes.

12. The method defined in claim 11 further comprising:
receiving the first node ID at a selection input of a multiplexer; and
selecting as an output one of the plurality of TIDs selected based on the first node ID.

13. The method defined in claim 12 further comprising:
bypassing at least one generated TID to another buffer to enable selection of the at least one generated TID in a next or subsequent cycle.

14. The method defined in claim 13 further comprising:
issuing a cache event to be processed prior to determining the TID pool from which a resource is to be allocated; and
rejecting the cache event for reissue when the determined TID pool does not have allocation resource.

15. The method defined in claim 13 further comprising:
issuing a cache event to be processed prior to determining the TID pool from which a resource is to be allocated; and
in a case where all TID pools are determined to have available allocation resource, speculatively decrementing all the resources, and returning resources back to TID pools that do not match the later determined TID pool.

16. The method defined in claim 13 further comprising:
issuing a cache event to be processed prior to determining the TID pool from which a resource is to be allocated;
stalling other succeeding events until the TID pool corresponding to the cache event is determined; and
then if the TID pool has available resource, the cache event is to succeed, removing the stall condition, or if the TID pool does not have available resource, failing or retrying the cache event.

17. The method defined in claim 13 further comprising:
issuing a cache event to be processed prior to determining the TID pool from which a resource is to be allocated, by performing a speculative resource decrement operation when all TID pools have free resources, and stalling succeeding events when not all TID pools have free resources.

18. An apparatus comprising:
one or more cache agents;
a protocol agent coupled to receive events corresponding to cache operations from one of the one or more cache agents, wherein the protocol agent comprises
a decoder to generate a first node ID indicative of the destination of a cache transaction from one or more caching agents;
a transaction ID allocation logic coupled to and operating in parallel to the decoder to pre-select one or more transaction IDs for each possible first node ID and then to select a transaction ID (TID) for the transaction based on the first node ID;
a packet creation unit to create a packet that includes the transaction, the first node ID, the TID and a second node ID corresponding to the requestor.

19. The apparatus defined in claim 18 wherein the TID allocation logic comprises:
a memory to store a plurality of pools of TIDs;
a plurality of buffers, each of the plurality of buffers to store a plurality of TIDS, wherein the plurality of TIDs include one from each of the plurality of pools; and
a multiplexer coupled to one of the plurality of buffers and having a selection input coupled to receive the first node ID, the multiplexer outputting one of the plurality of TIDs selected based on the first node ID.

20. The apparatus defined in claim 19 wherein each of the plurality of buffers store one pre-selected TIDs speculatively chosen from each pool.

21. The apparatus defined in claim 19 further comprising bypass logic associated with each location of each buffer, the bypass logic having a plurality of inputs and an output coupled to provide each buffer location with a TID, the plurality of inputs of one or more of the buffers being coupled to a feedback of the TID from an output of the buffer location and an output of another of the buffers.

22. The apparatus defined in claim 21 wherein one of the plurality of inputs is coupled to receive a recently retired TID to enable reuse of the recently retired TID.

23. The apparatus defined in claim 18 wherein both the decoder generates the first node ID and the allocation logic generates the TID in response to receiving the transaction.

24. The apparatus defined in claim 23 further comprising an arbiter coupled to the decoder and the allocation logic to provide the transaction.

* * * * *

UNITED STATES PATENT AND TRADEMARK OFFICE
CERTIFICATE OF CORRECTION

PATENT NO. : 7,620,694 B2
APPLICATION NO. : 11/237285
DATED : November 17, 2009
INVENTOR(S) : Benjamin Tsien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-sixth Day of October, 2010

David J. Kappos
*Director of the United States Patent and Trademark Office*